United States Patent [19]

Tanaka

[11] Patent Number: 5,552,905
[45] Date of Patent: Sep. 3, 1996

[54] IMAGE PROCESSING APPARATUS WHICH SELECTS A TYPE OF COLOR PROCESSING FOR COLOR IMAGE DATA BASED ON A CHARACTERISTIC OF THE COLOR IMAGE DATA

[75] Inventor: Fumihiro Tanaka, Yono, Japan

[73] Assignee: Canon Kabushiki Kaisha, Tokyo, Japan

[21] Appl. No.: 400,382

[22] Filed: Mar. 3, 1995

Related U.S. Application Data

[63] Continuation of Ser. No. 895,008, Jun. 8, 1992, abandoned.

[30] Foreign Application Priority Data

Jun. 14, 1991 [JP] Japan .................................. 3-142892

[51] Int. Cl.$^6$ .............................. G09G 5/06; H04N 1/46; H04N 1/40
[52] U.S. Cl. .................... 358/523; 358/404; 358/448; 358/524; 358/525; 358/517; 345/199; 382/167
[58] Field of Search .................... 358/404, 501, 358/502, 503, 518, 524, 515, 523, 504, 517, 448, 444, 525, 535, 457; 345/154, 199; 348/30, 649, 661, 717; 382/167; G09G 5/06; H04N 1/46, 1/40

[56] References Cited

U.S. PATENT DOCUMENTS

| | | | |
|---|---|---|---|
| 4,468,692 | 8/1984 | Yamada | 358/76 |
| 4,631,578 | 12/1986 | Sasaki et al. | 358/80 |
| 4,636,844 | 1/1987 | Sasaki | 358/80 |
| 4,639,771 | 1/1987 | Hattori | 358/80 |
| 4,654,720 | 3/1987 | Tozawa | 358/283 |
| 4,727,425 | 2/1988 | Mayne | 358/80 |
| 4,745,466 | 5/1988 | Yoshida et al. | 358/80 |
| 4,823,120 | 4/1989 | Thompson et al. | 340/703 |
| 4,853,768 | 8/1989 | Suzuki et al. | 358/80 |
| 4,866,514 | 9/1989 | Yeomans | 358/80 |
| 4,954,889 | 9/1990 | Endo et al. | 358/517 |
| 4,959,711 | 9/1990 | Hung et al. | 358/523 |
| 4,965,664 | 10/1990 | Udagawa et al. | 358/80 |
| 4,992,861 | 2/1991 | D'Errico | 358/525 |
| 5,060,060 | 10/1991 | Udagawa et al. | 358/80 |
| 5,073,818 | 12/1991 | Iida | 358/75 |
| 5,081,527 | 1/1992 | Naito | 358/75 |
| 5,323,249 | 6/1994 | Liang | 358/523 |
| 5,331,439 | 7/1994 | Bachar | 358/523 |
| 5,426,596 | 6/1995 | Ogawa | 358/523 |

FOREIGN PATENT DOCUMENTS

| | | |
|---|---|---|
| 0313789 | 5/1989 | European Pat. Off. . |
| 0321983 | 6/1989 | European Pat. Off. . |
| 0387005 | 9/1990 | European Pat. Off. . |

*Primary Examiner*—Edward L. Coles, Sr.
*Assistant Examiner*—Kimberly A. Williams
*Attorney, Agent, or Firm*—Fitzpatrick, Cella, Harper & Scinto

[57] ABSTRACT

This invention has as its object to provide an image recording apparatus, which can omit a color processing calculation process for designated colors of an image when color processing results for all the colors, which may be designated upon image drawings, can be held, and can increase an image recording processing speed without impairing color reproducibility of an image. Upon conversion from color coordinate values in a color space for designating image colors of input image data from a host computer (2) into color coordinate values in a color space inherent to the recording apparatus, a CPU (1) registers, in a color processing table (7b), the color coordinate values in the color space inherent to the recording apparatus for all the colors input as image data, and performs color coordinate conversion by retrieving the color coordinate values held in the color processing table (7c) as much as possible upon execution of the color coordinate conversion in place of performing a color processing calculation in each conversion.

24 Claims, 4 Drawing Sheets

| \<ESC\> | \<width\> | \<height\> | \<bits\> | IMAGE DATA ....... |

ESC :  ESCAPE CODE (CODE = 0x10)
width :  NUMBER OF HORIZONTAL PIXELS OF IMAGE DATA
height :  NUMBER OF VERTICAL PIXELS OF IMAGE DATA
bits :  BIT LENGTH OF DATA PER COLOR OF ONE PIXEL
IMAGE DATA :  IMAGE DATA DOT-SEQUENTIALLY ALIGNED BASED ON
RGB LUMINANCE VALUE OF NTSC STANDARDS
(REPRESENTING NON-EMISSION STATE WHEN R, G, B = 0)

FIG. 2

IMAGE PROCESSING APPARATUS WHICH SELECTS A TYPE OF COLOR PROCESSING FOR COLOR IMAGE DATA BASED ON A CHARACTERISTIC OF THE COLOR IMAGE DATA

This application is a continuation of application Ser. No. 07/895,008 filed Jun. 8, 1992, now abandoned.

BACKGROUND OF THE INVENTION

1. Field of the Invention

The present invention relates to an image recording apparatus capable of performing image recording using a plurality of colors.

2. Description of the Related Art

In a conventional image recording apparatus for recording a plurality of color images, a color space (to be referred to as an "input color space" hereinafter) used upon designation of image colors does not always coincide with a color space (to be referred to as an "output color space" hereinafter) for actually recording an image.

In many apparatuses, the two color spaces do not coincide with each other such that the input color space used upon designation of image colors is a color space of red, green, and blue (RGB color space; a reference light source is a C light source of the CIE) of the NTSC standards, and the output color space used in actual image recording is a color space of yellow, magenta, cyan, and black (YMCK color space) inherent to a recording apparatus.

For this reason, in the image recording apparatus, the values in the output color space must be obtained by converting the designated values in the input color space so as to reproduce colors designated in the input color space.

Conversion from the values in the input color space to the values in the output color space will be referred to as color processing hereinafter.

Various color processing methods have been proposed and put into practical applications.

FIG. 4 shows an example of conventional color processing.

In the example shown in FIG. 4, the input color space is an RGB color space of the NTSC standards, and is converted into a YMCK color space inherent to the recording apparatus.

A LOG converter 41 performs conversion using a logarithmic function, and a masking circuit 42 then performs linear conversion based on the values converted by the LOG converter 41. The linear conversion results are determined as the values in the YMCK color space. The conversion coefficient values used in the linear conversion in the masking circuit 42 are determined in consideration of ink characteristics, and the like of a recording apparatus of interest. FIG. 4 also shows masking formulas used in the conversion of the conventional masking circuit.

As described above, the conventional image recording apparatus for recording an image having a plurality of colors converts colors designated in the input color space into values in the output color space, thereafter, generates patterns in units of output colors, and then performs recording.

For this reason, a numerical value calculation amount in the color processing for reproducing the colors designated in the input color space is large, and a processing time required for this calculation prolongs a time required for image recording.

In some prior arts, the color processing is simplified to decrease a calculation amount so as to shorten the color processing time. However, the colors of a recorded image considerably become different from the designated colors.

SUMMARY OF THE INVENTION

The present invention has been made to solve the above-mentioned problems, and has as its object to provide an image recording apparatus, which can increase image recording processing speed without impairing color reproducibility of an image by simplifying the color processing calculation process for designated colors of an image as much as possible.

As a means for achieving the above object, the present invention comprises the following arrangement.

That is, an image recording apparatus capable of performing image recording using a plurality of colors, comprises conversion means for converting color coordinate values in a color space for designating image colors into color coordinate values in a color space inherent to the recording apparatus, holding means for holding the color coordinate values in the color space inherent to the recording apparatus for all colors input as image data, discrimination means for discriminating whether or not an area required for a holding operation of the holding means can be assured, assuring means for, when the discrimination means determines that the required area can be assured, assuring the required area, and retrieval means for retrieving the color coordinate values held in the holding means upon execution of color coordinate conversion by the conversion means.

In the above arrangement, when input image data is converted into image data in a different color space matching with a recording apparatus, the color processing results held in the holding means are retrieved and used for any colors that can be designated as much as possible in place of a color processing calculation.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2 shows a format of an image command of this embodiment;

DETAILED DESCRIPTION OF THE PREFERRED EMBODIMENTS

The preferred embodiment of the present invention will be described in detail below with reference to the accompanying drawings.

<Description of Apparatus Arrangement (FIG. 1)>

Figure 1:
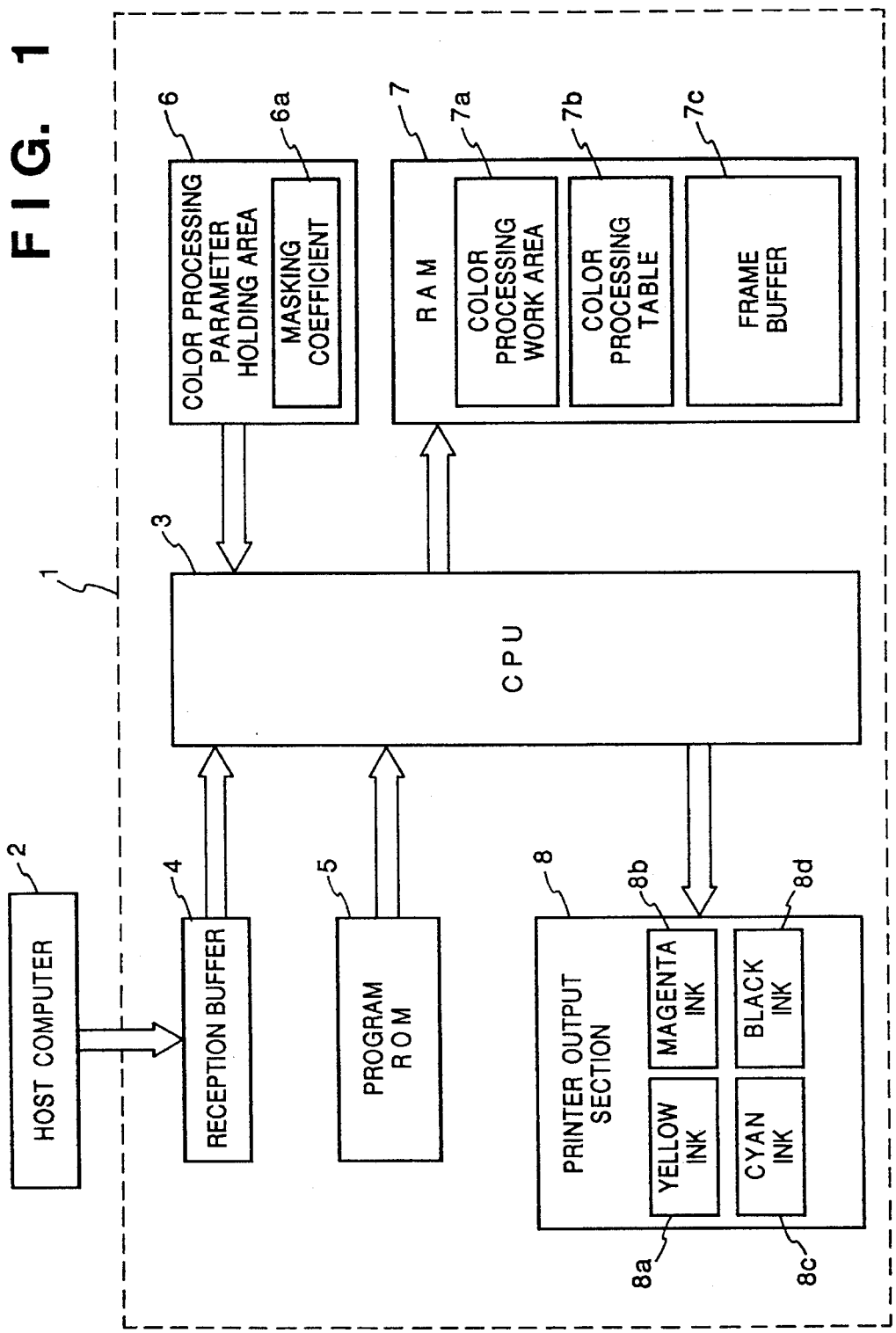
FIG. 1 is a block diagram showing an arrangement according to an embodiment of the present invention.

FIG. 1 is a block diagram showing an arrangement according to an embodiment of the present invention. FIG. 1 exemplifies a case wherein this embodiment is applied to a printer for printing out data input from a host computer 2.

In FIG. 1, reference numeral 1 denotes a printer main body of this embodiment, which generates binary pattern data from image data input in the format of an image command from the host computer 2, and prints the pattern data using a total of four color inks, i.e., yellow (Y), magenta (M), cyan (C), and black (K). The host computer 2 supplies print data to the printer 1 of this embodiment. Note that the print data means a command string consisting of an image command and a paper exhaust command.

FIG. 2 shows the format of the image command used in this embodiment.

In this embodiment, the printer, which processes only the image command and the paper exhaust command, and performs a print operation, will be described for the sake of simplicity.

The printer 1 of this embodiment comprises the following constituent members.

Reference numeral 3 denotes a CPU for controlling the printer main body according to a program (FIG. 3; to be described later) stored in a program ROM 5. Reference numeral 4 denotes a reception buffer for temporarily storing print data supplied from the host computer 2. Note that reception of the print data is processed in an interrupt routine (not shown). Reference numeral 5 denotes the ROM for storing a program having an algorithm shown in FIG. 3, which is used by the CPU 3 to control the printer main body. Reference numeral 6 denotes an area for holding various parameters used upon execution of color processing. The area 6 comprises a ROM. Reference numeral 6a denotes a masking coefficient used upon execution of masking processing as part of the color processing.

Note that the masking processing of this embodiment is executed using the following formulas.

$$Y = a_{11}Y' + a_{12}M' + a_{13}C'$$

$$M = a_{21}Y' + a_{22}M' + a_{23}C'$$

$$C = a_{31}Y' + a_{32}M' + a_{33}C'$$

where $a_{11}$ to $a_{33}$ are the masking coefficients.

Reference numeral 7 denotes a RAM used by the CPU 3 to hold various data during an operation. The RAM 7 is allocated with a color processing work area 7a used in the color processing, a color processing table 7b for holding color processing results for all the colors, and a frame buffer 7c for holding binary print patterns.

The frame buffer 7c is divided into four internal areas respectively corresponding to the four colors and holds Y, M, C, and K print patterns.

Reference numeral 8 denotes a printer output section for printing the print patterns generated in the frame buffer 7c onto a print paper sheet. The printer output section 8 can reproduce and print an arbitrary color by printing image patterns in units of Y, M, C, and K colors to overlap each other.

<Description of Print Processing Procedure (FIG. 3)>

The image command of this embodiment designates colors of pixels as R, G, and B luminance data according to the NTSC standards. For this purpose, the R, G, and B pixel colors must be converted into Y, M, C, and K data.

The print processing procedure of this embodiment including processing for converting R, G, and B pixel colors into Y, M, C, and K data will be described in detail below with reference to the flow chart shown in FIG. 3.

Figure 3:
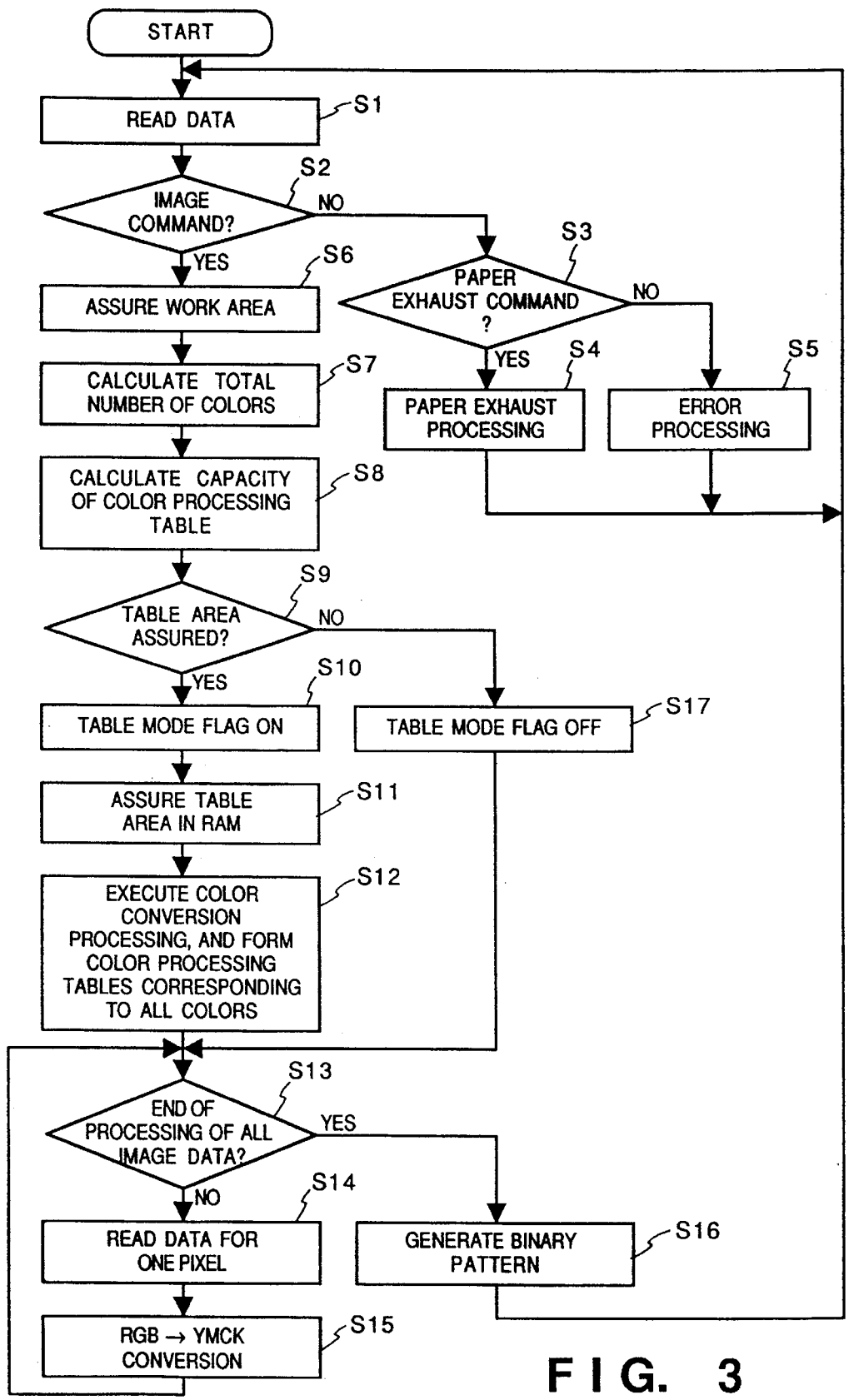
FIG. 3 is a flow chart for explaining an image recording operation of this embodiment.
Figure 4:
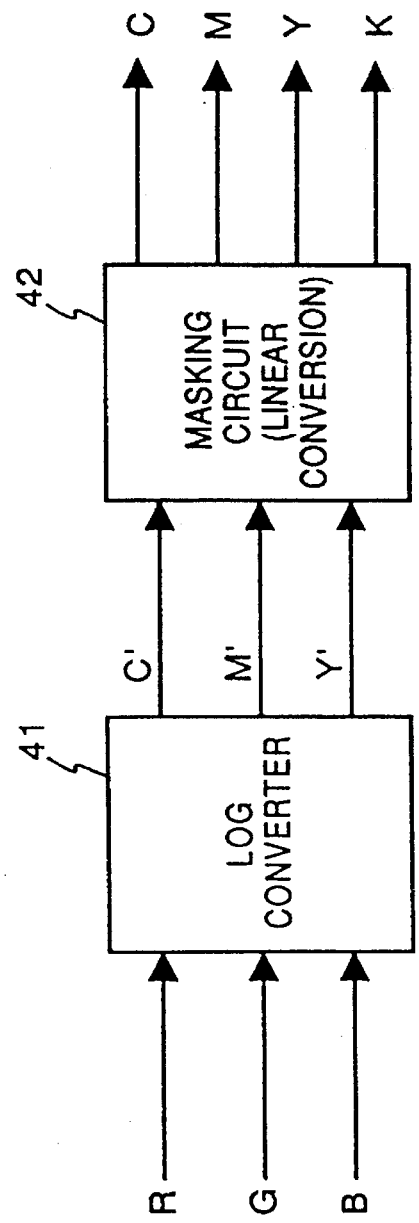
FIG. 4 is a diagram showing a conventional color processing procedure.

The flow chart of FIG. 3 shows the control algorithm of the CPU 3 according to the program stored in the program ROM 5 in FIG. 1.

In step S1, data received from the host computer 2 and held in the reception buffer 4 is read. In step S2, it is checked if the read data is an image command. If NO in step S2, the flow advances to step S3 to check if the read data is a paper exhaust command. If YES in step S3, the flow advances to step S4 to perform paper exhaust processing, and binary color patterns on the frame buffer 7c are cleared. Thereafter, the flow returns to step S1, and the control starts processing of the next command.

If it is determined in step S3 that the read data is not the paper exhaust command, the flow advances to step S5 to perform error processing, and the flow returns to step S1 to process the next command. When execution of another processing command is permitted, execution processing of the permitted processing command is performed.

If it is determined in step S2 that the read data is the image command, the flow advances to processing in step S6 and subsequent steps, and image drawing processing is performed.

In step S6, a work area, which is required during image drawing (mainly in generation of binary patterns), is assured in the RAM 7. In step S7, the number of colors designated as pixel colors by the image data is calculated.

The number of colors can be easily calculated based on the number of bits per image pixel given in the image command. For example, in the case of a binary image using one bit per pixel (a total of 3 bits for R, G, and B pixels), one pixel can designate one of colors for 3 bits, i.e., 8 different colors. In the case of a binary image using two bits per pixel (a total of 6 bits for R, G, and B pixels), one pixel can designate one of colors for 6 bits, i.e., 32 different colors. More specifically, the number of colors, which can be designated per pixel, is 8 when one pixel is expressed by 1 bit, and is 32 when one pixel is expressed by 2 bits.

In step S8, the capacity of the color processing table necessary for holding the color processing results of all the colors obtained in step S7 is calculated. This calculation is attained by (the number of bytes of a color processing result per color)×(the total number of colors).

In step S9, it is checked if an area (in the RAM) large enough to create the color processing table is assured. If it is determined in step S9 that the color processing table can be assured, the flow advances to step S10 to set a table mode flag in an ON state. The table mode flag is used in color conversion in step S15 (to be described later).

The flow then advances to step S11 to assure the area 7a for the color processing table in the RAM 7. Subsequently, in step S12, the color processing results for all the colors (which results are obtained by converting R, G, and B image data for all the colors into Y, M, C, and K data) are registered in the color processing table. The flow advances to step S13. The color processing results are known to those who are skilled in the art, and a detailed description thereof will be omitted.

On the other hand, if NO in step S9, the flow advances to step S17 to set the table mode flag in an OFF state. The flow then advances to step S13 and subsequent steps.

In steps S13 to S15, processing for converting all the R, G, and B image data into Y, M, C, and K image data is performed. In step S13, it is checked if processing for all the image data has been completed. If NO in step S13, the flow advances to step S14 to read image data for one pixel. In step S15, R, G, and B image data are converted into Y, M, C, and K image data. The flow then returns to step S13.

In step S15, RGB-YMCK conversion of image data is performed in units of pixels. At this time, when the table mode flag is ON, the color processing results held in the color processing table 7b are retrieved, and the conversion is performed using the retrieved values without using actual conversion coefficients.

On the other hand, when the table mode flag is OFF, since this means that no table for holding the color processing results is present, a color processing calculation is actually performed in step S15.

Upon completion of conversion of all the image data to Y, M, C, and K data, the flow advances from step S13 to step S16, and the Y, M, C, and K image data obtained so far are binarized, thereby generating binary image patterns in correspondence with Y, M, C, and K colors. Note that the binary patterns are generated and held in the frame buffer 7c in FIG. 1.

In the RGB-YMCK conversion in the above description, as for a method of generating K, the minimum value of Y, M, and C is used as K, and the value K is subtracted from the Y, M, and C values to generate new Y, M, C, and K values.

As described above, according to this embodiment, when the color processing results for all the designated colors which may be encountered upon image drawing can be held, the color processing results for all the designated colors are calculated and held. The color processing results are used in processing of image data later, thereby decreasing the color processing calculation amount.

Another Embodiment

In the above embodiment, R, G, and B values used in, e.g., the NTSC method are used to express pixel colors of image data. However, pixel colors may be expressed by other R, G, and B values or L*, a*, and b* values in a uniform color space defined by the CIE.

In the above embodiment, linear equations are used as the masking formulas. Alternatively, the masking formulas may include quadratic terms. More specifically, the present invention is not limited to a color processing calculation method (calculation formulas).

In the above embodiment, a binarization method used for generating binary patterns is not described in detail. However, the present invention is not limited to using a binarization method. For example, various binarization methods such as binarization processing based on a dither method, an error diffusion method, and the like may be used.

The present invention may be applied to a system consisting of a plurality of devices or to an apparatus consisting of one device. The present invention may also be applied to a case wherein the effect of the present invention is achieved by supplying a program to a system or apparatus, as a matter of course.

As described above, according to the present invention, when the color processing results for all the colors, which may be designated upon image drawing, can be held, the color processing calculation process for the designated colors of an image can be omitted, and the image recording processing speed can be increased without impairing color reproducibility of an image.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

input means for inputting color image data representing an object image;

first determination means for determining whether or not a look-up table (LUT) for color processing input image data is to be generated, the determining being performed in accordance with a characteristic of the color image data representing the object image;

generation means for generating the LUT based on a determination result of said first determination means; and first color processing means for performing first color processing on the color image data using the LUT generated by said generation means; and second color processing means for performing second color processing, which is different from the first color processing performed by said first color processing means, on the color image data in a case where said first determination means determines that the LUT is not to be generated.

2. The apparatus according to claim 1, wherein said first determination means includes means for obtaining, in accordance with the input image data, a number of colors which can be designated for the color processing, said first determination means basing its determination as to whether or not the LUT can be generated upon the number of colors obtained.

3. The apparatus according to claim 1, wherein said second color processing means uses an arithmetic operation in a case where said first determination means determines that the LUT is not to be generated.

4. The apparatus according to claim 3, wherein the arithmetic operation is a masking operation.

5. The apparatus according to claim 3, wherein in a case where said first determination means determines that the LUT is to be generated, said first determination means turns a flag on, while in a case where said first determination means determines that the LUT is not to be generated, said first determination means turns the flag off.

6. The apparatus according to claim 1, wherein said first color processing means performs color processing by converting the input image data into image data representing approximately a same color as the input image data in a color space corresponding to an output device.

7. The apparatus according to claim 1, wherein the input image data is input from a host computer by means of an image command.

8. The apparatus according to claim 7, wherein one of the image command and a paper exhaust command is input from the host computer, and wherein said apparatus further comprises second determination means for determining whether the host computer input is the paper exhaust command or the image command.

9. The apparatus according to claim 1, further comprising image forming means for forming an image based on an output from said first color processing means.

10. The apparatus according to claim 1, wherein the input image data is red, green and blue (RGB) color component data.

11. The apparatus according to claim 1, wherein the input image data is defined by a uniform color space.

12. The apparatus according to claim 1, wherein the LUT is stored in a random access memory (RAM).

13. The apparatus according to claim 1, further comprising memory means for storing said look-up table, wherein said first determination means determines whether or not said LUT table is to be generated in accordance with a capacity of said memory means.

14. An image processing method comprising:

an input step of inputting color image data representing an object image;

a first determination step of determining whether or not a look-up table (LUT) for color processing the color image data is to be generated, the determining being performed in accordance with a characteristic of the color image data representing the object image;

a generation step of generating the LUT based on a determination result of said first determination step;

a first color processing step of performing first color processing on the color image data using the LUT generated by said generation step; and a second color processing step of performing second color processing, which is different from the first color processing performed in said first color processing step, on the color image data in a case where said determination step determines that the LUT is not to be generated.

15. An image processing apparatus comprising:

first color processing means for generating a look-up table (LUT) on the basis of color image data representing an object image, and for performing color processing on the color image data using the LUT;

second color processing means for performing the color processing on the color image data using an arithmetic operation; and selection means for selecting, in accordance with a characteristic of the color image data, one of said first color processing means or said second color processing means to be used for color processing an object image.

16. The apparatus according to claim 15, wherein said first color processing means performs color processing by converting the object image into image data representing approximately the same color as the object image, in a color space corresponding to an output device.

17. The apparatus according to claim 15, wherein the object image is input from a host computer by means of an image command.

18. The apparatus according to claim 17, wherein one of the image command and a paper exhaust command is input from the host computer, and wherein said apparatus further comprises determination means for determining whether the host computer input is the paper exhaust command or the image command.

19. The apparatus according to claim 15, further comprising image forming means for forming an image based on an output from said first color processing means or said second color processing means as selected by said selection means.

20. The apparatus according to claim 15, wherein the object image constitutes red, green and blue (RGB) color component data.

21. The apparatus according to claim 15, wherein the object image is defined by a uniform color space.

22. The apparatus according to claim 15, wherein said second color processing means performs a masking operation.

23. The apparatus according to claim 15, further comprising memory means for storing said look-up table, wherein said selection means selects between said first color processing means and said second color processing means in accordance with a capacity of said memory means.

24. An image processing method comprising:

a first color processing step for generating a look-up table (LUT) on the basis of color image data representing an object image, and for performing color processing on the color image data using the LUT;

a second color processing step of performing the color processing on the color image data using an arithmetic operation without generating the LUT; and a selection step of for selecting, in accordance with a characteristic of the color image data, between said first color processing step and said second color processing step for color processing an object image.

* * * * *